(12) United States Patent
Gillespie et al.

(10) Patent No.: US 7,766,262 B2
(45) Date of Patent: Aug. 3, 2010

(54) IRRIGATION SYSTEMS INCLUDING FLUSH VALVES, AND METHODS FOR FLUSHING DEBRIS FROM IRRIGATION SYSTEMS

(76) Inventors: Barton W. Gillespie, 1011 W. Hwy. 26, Blackfoot, ID (US) 83221; Dana Duffin, 914 6$^{th}$ St., Rupert, ID (US) 83350

( * ) Notice: Subject to any disclaimer, the term of this patent is extended or adjusted under 35 U.S.C. 154(b) by 374 days.

(21) Appl. No.: 11/748,226

(22) Filed: May 14, 2007

(65) Prior Publication Data

US 2008/0283637 A1    Nov. 20, 2008

(51) Int. Cl.
- B05B 3/18 (2006.01)
- B05B 3/00 (2006.01)
- B05B 15/02 (2006.01)
- F16K 15/14 (2006.01)
- F16K 15/00 (2006.01)
- F16K 15/06 (2006.01)

(52) U.S. Cl. ............ 239/741; 239/110; 239/111; 239/726; 137/517

(58) Field of Classification Search ............ 239/104, 239/106, 110, 111, 456, 459, 533.15, 570, 239/572, 583, 723, 726, 741; 137/517
See application file for complete search history.

(56) References Cited

U.S. PATENT DOCUMENTS

| | | | |
|---|---|---|---|
| 2,627,871 A | 2/1953 | Adair | |
| 2,647,533 A * | 8/1953 | Beymer | 137/517 |
| 3,002,697 A | 10/1961 | Jones | |
| 3,143,298 A | 8/1964 | Jones | |
| 3,193,204 A | 7/1965 | Walton et al. | |
| 3,272,438 A | 9/1966 | Purtell | |
| 3,516,609 A * | 6/1970 | Gheen et al. | 239/734 |
| 3,603,508 A | 9/1971 | Ingram et al. | |
| 3,735,928 A * | 5/1973 | Watts et al. | 239/267 |
| 3,807,430 A | 4/1974 | Keller | |
| 3,807,638 A * | 4/1974 | Clements | 239/734 |
| 3,856,039 A | 12/1974 | Courtright | |
| 3,908,694 A | 9/1975 | Spears | |
| 3,918,483 A | 11/1975 | Van Leeuwen | |
| 3,999,570 A * | 12/1976 | Clements | 137/517 |
| 4,022,244 A | 5/1977 | Oman | |
| 4,054,152 A | 10/1977 | Ito et al. | |
| 4,204,643 A | 5/1980 | Cornelius | |
| 4,382,556 A | 5/1983 | Hunter | |

(Continued)

OTHER PUBLICATIONS

Hill, Robert, "Wheelmove Sprinkler Irrigation Operation and Management," Utah State University Extension Electronic Publishing, Aug. 2000, pp. 1-5, Logan, Utah. Website: http://extension.usu.edu/files/publications/publication/ENGR_BIE_WM_08.pdf.

(Continued)

*Primary Examiner*—Darren W Gorman
(74) *Attorney, Agent, or Firm*—TraskBritt

(57) ABSTRACT

Valves for use in irrigation systems include a moveable sealing member disposed within a valve body. The moveable sealing member is configured to close automatically the valve when the magnitude of a pressure differential between the inlet and the outlet of the valve body reaches a predetermined threshold value and to open automatically the valve when the magnitude of the pressure differential falls below the predetermined threshold value. Irrigation systems include such valves and methods for flushing debris out of the irrigation systems using such valves.

13 Claims, 7 Drawing Sheets

U.S. PATENT DOCUMENTS

| | | |
|---|---|---|
| 4,700,897 A | 10/1987 | Smith et al. |
| 4,726,529 A | 2/1988 | Nislar et al. |
| 4,763,837 A | 8/1988 | Livneh |
| 4,821,965 A | 4/1989 | Smith |
| 5,174,507 A | 12/1992 | Sapp |
| 5,193,578 A * | 3/1993 | Noriyuki .................... 137/521 |
| 5,863,443 A | 1/1999 | Mainwaring |
| 6,209,570 B1 | 4/2001 | DeBello |
| 6,516,829 B1 | 2/2003 | Townsend et al. |
| 6,889,707 B2 | 5/2005 | Nicolino |
| 7,377,286 B2 * | 5/2008 | King et al. .................... 137/1 |

OTHER PUBLICATIONS

Wade Rain catalog, "Poweroll," Sep. 2000, pp. 53-63, Wade Mfg. Co., Portland, Oregon. Website:http://www.waderain.com/_private/downloads/poweroll_np.pdf.

Valve Stubs, Website: http://www.bossirrigation.com/ENGLISH/valvestubs.htm , Feb. 7, 2007, (2 pages).

* cited by examiner

IRRIGATION SYSTEMS INCLUDING FLUSH VALVES, AND METHODS FOR FLUSHING DEBRIS FROM IRRIGATION SYSTEMS

FIELD OF THE INVENTION

The present invention relates to pipeline irrigation systems and to methods for flushing debris out from such irrigation systems. More particularly, it relates to flush valves for connection to the end of a water supply pipe of an irrigation system and methods for using the flush valves to flush debris from irrigation systems.

BACKGROUND OF THE INVENTION

In areas where natural precipitation is insufficient, irrigation is necessary for the production of many agricultural crops. Common types of irrigation systems include center pivot systems, wheel-line systems, dragline systems, drip irrigation systems, subterranean irrigation systems, and sprinkler line systems. Each of these systems conventionally includes a water supply pipe. In some irrigations systems the water supply pipe may be formed from multiple pipe sections connected end-to-end by couplers. A plurality of sprinklers is typically mounted at intervals along the water supply pipe.

Water for the irrigation systems may be supplied from a number of sources including, for example, lakes, reservoirs, canals, ditches, rivers, and wells. The water from most of these sources, especially surface water sources, often contains solid debris, such as weeds, grass, sand, sticks, insects, or other solid objects. During operation of the irrigation system, this debris may build up within the water supply pipe and may clog one or more of the sprinklers or even the water supply pipe itself. The debris typically builds up at a second end of the water supply pipe referred to herein as the "distal" end of the water supply pipe, this end being the end that is relatively distant to the water source. The accumulation of debris in the distal end of the water supply pipe may cause sprinklers, especially those proximate the distal end of the water supply pipe, to clog and thereby cease to function properly or at all.

One method of filtering debris in irrigation systems is a simple screen near the inlet end of the pipeline against which the water flow is directed and which prevents larger debris from entering the water supply pipes. Such screens work on a gross level; however, they often allow smaller debris to enter the irrigation system which over time causes clogging of the sprinklers. Furthermore, screens must be monitored to ensure they are promptly cleaned as they become plugged with debris.

Another method for filtering debris, which is commonly used, is an end plug or flush plug placed on the distal end of the water supply pipe. A conventional end plug includes a cap for the end of the water supply pipe that can be manually opened. Once the cap is manually opened, water is sent through the irrigation system to flush any debris in the irrigation system out the distal end of the water supply pipe. A major disadvantage of conventional end plugs is that a person operating the irrigation system alone must travel back and forth between the proximal and distal ends of the water supply pipe to flush the debris out from the water supply pipe. For example, it may be required to travel to the distal end of the water supply pipe, typically a fourth of a mile in length or longer in wheel-line and center pivot systems, to open manually the cap, travel back to the proximal end of the water supply pipe to turn on the water to flush the system, and then travel back to the distal end of the water supply pipe to close manually the cap once the system has been flushed. Furthermore, depending on the type of irrigation system, accessing the end plug may be difficult or awkward. For example, the height of the water supply pipe in a center pivot system can cause the end plug to be difficult to reach. Another disadvantage of conventional end plugs is they provide no way of knowing if the irrigation system needs to be flushed. Typically, the only way to know that a flush is needed is when the sprinklers at the distal end of the water supply pipe stop functioning properly. This requires either regular or constant supervision, or assumption of the risk that a portion of the field will not be watered sufficiently.

Therefore, there is a need in the art for a flushing system that can be used to flush debris from water supply pipes of irrigation systems such as, for example, wheel-line irrigation systems that do not require manual manipulation or operation of the valves to flush the water supply pipes. Additionally there is a need in the art for devices that flush debris out from water supply pipes before the debris clogs any sprinklers along the water supply pipes.

BRIEF SUMMARY OF THE INVENTION

In one aspect, the present invention includes valves for the distal end of an irrigation pipeline including a valve body having an inlet and an outlet. The valve body may include an outer wall, an inner wall, and a sealing wall with at least one aperture extending therethrough located between the inlet and the outlet. The valves may further include a moveable sealing member disposed within the valve body that is moveable between a first position and a second position. The moveable sealing member may be configured to abut against the sealing wall of the valve body and prevent fluid flow from the inlet to the outlet through the at least one aperture in the first position. In the second position the moveable sealing member may be configured to allow fluid flow from the inlet to the outlet through that aperture or apertures. The moveable sealing member may be biased to the second position and configured to move automatically from the second position to the first position when a magnitude of a pressure differential between the inlet and the outlet of the valve body reaches a predetermined threshold value.

In another aspect, the present invention includes irrigation systems having at least one water supply pipe, at least one sprinkler device mounted to such water supply pipe, and a valve attached to a longitudinal (distal) end of the water supply pipe. The valve may include a valve body having an inlet and an outlet that are positioned substantially in-line with such water supply pipe. The valve may further include a moveable sealing member disposed within the valve body which may be moveable between a first position and a second position. The moveable sealing member may be configured to prevent fluid flow from the inlet to the outlet in the first position and to allow fluid flow from the inlet to the outlet in its second position. The moveable sealing member may be biased to the second position and configured to move automatically from the second position to the first position when a magnitude of a pressure differential between the inlet and the outlet of the valve body reaches a predetermined threshold value.

In yet another aspect, the present invention includes methods of flushing or discharging accumulated debris out from pipeline irrigation systems. The methods include biasing a moveable sealing member within a valve body on an end of an irrigation pipe with a biasing force to an open position and enabling fluid communication through the valve body between an inlet and an outlet thereof. In some embodiments, the fluid communication may be provided along a fluid path extending between the inlet and the outlet in a direction generally parallel to a longitudinal axis of the irrigation pipe. Hydraulic pressure may be generated within the water supply pipe to generate a pressure differential between the inlet and the outlet having a magnitude sufficient to cause the moveable sealing member to move automatically from the open position to a closed position. In the closed position, the sealing member may prevent fluid communication through the valve body between the inlet and the outlet. The pressure differential between the inlet and the outlet then may be reduced to allow the moveable sealing member to move automatically from the closed position to the open position in response to the biasing force. As the sealing member returns to the open position, the pressure differential may cause water and accumulated debris within the irrigation pipe to be discharged out from the pipe through the valve body.

The features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

While the specification concludes with claims particularly pointing out and distinctly claiming that which is regarded as the present invention, various features and advantages of this invention may be more readily ascertained from the following description of the invention when read in conjunction with the accompanying drawings, in which:

DETAILED DESCRIPTION OF THE INVENTION

It will be understood that the components of the present invention, as generally described and illustrated in the figures herein, may be arranged and designed in a wide variety of different configurations. Thus, the following detailed description of the embodiments of the apparatus and methods of the present invention, as represented in FIGS. 1 through 9, is not intended to limit the scope of the invention, which is as broad as claimed herein. The illustrations merely depict embodiments of the invention. These embodiments of the invention will be best understood by reference to the drawings, wherein like parts may be designated by like numerals. Those of ordinary skill in the art will, of course, appreciate that various additions, deletions and modifications to the illustrated embodiments may be effected without departing from the spirit and scope of the invention as defined by the claims that follow.

It will be understood that the flush valves of the present invention may be used on water supply pipes in all types of irrigation systems including without limitation center pivot systems, wheel-line systems, dragline systems, drip systems, subterranean systems, and sprinkler line systems. For convenience and as an example, the flush valves will be described in the following description with use in a wheel-line irrigation system; however, flush valves of the present invention are not limited to use solely with wheel-line irrigation systems but may be used with all types of irrigation systems.

Figure 1:
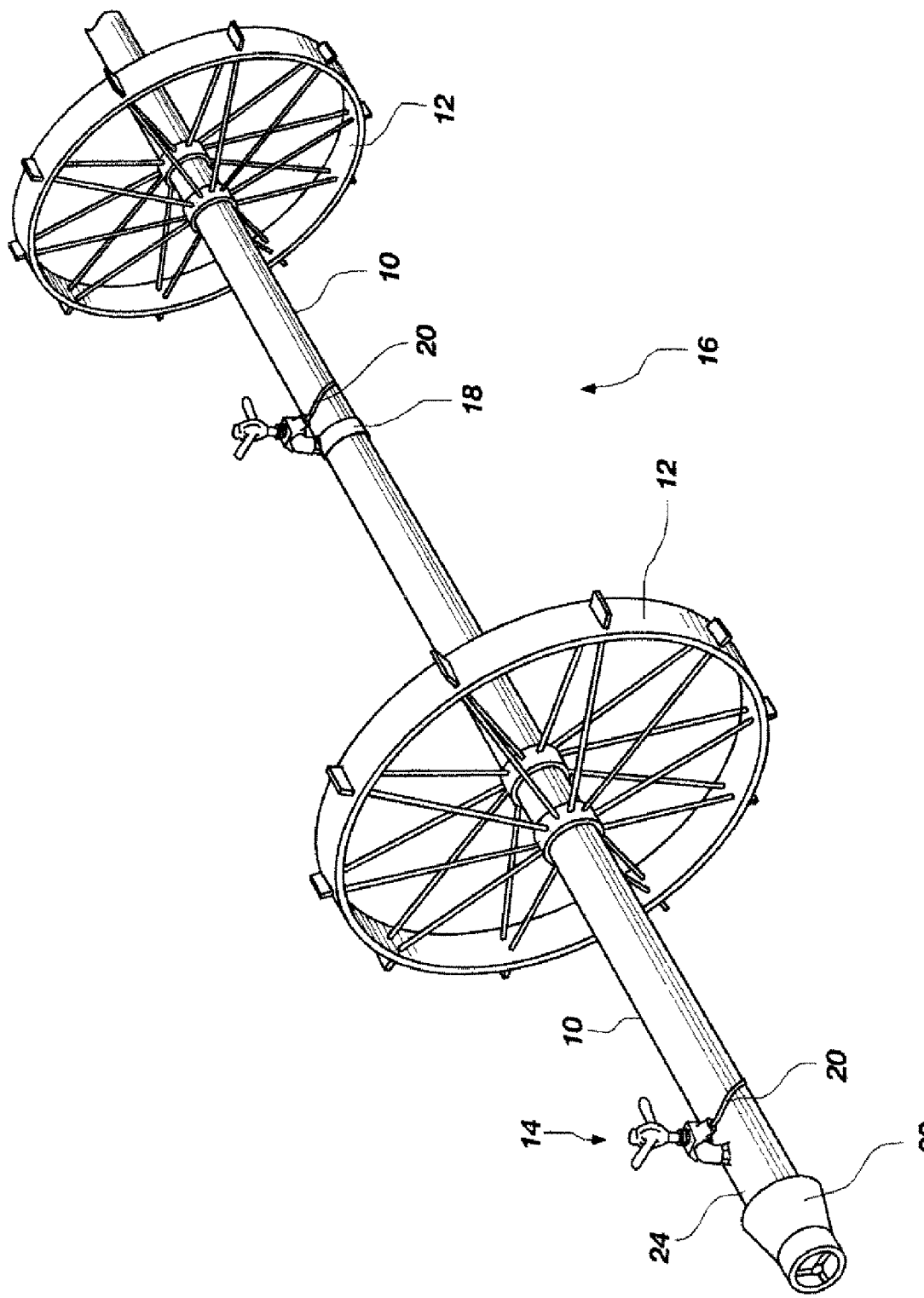
FIG. 1 is a perspective view of an embodiment of an irrigation system of the present invention that includes a flush valve on the end of a water supply pipe of a wheel-line.

Referring to FIG. 1, a wheel-line irrigation system 16 (also known as a wheelmove, sideroll, or lateral-roll irrigation) is shown. The wheel-line irrigation system 16 may include a hollow water supply pipe 10, which may be several hundred feet in length. The water supply pipe 10 may be made up of several sections which may be joined end-to-end using couplers 18. A proximal end of the water supply pipe 10 may include a coupling (not shown) for connecting the water supply pipe 10 to a water supply source. A plurality of wheels 12 may be mounted on the water supply pipe 10 at intervals along the longitudinal length thereof. The water supply pipe 10 (and the longitudinal axis thereof) may extend above the ground in a generally lateral or horizontal direction. The plurality of wheels 12 may be rigid, support the wheel-line irrigation system 16 above the ground, and may be used to roll the irrigation system 16 across a field of crops. An engine, motor, or power unit (not shown) may be used to drive the wheel-line irrigation system 16 across a field as necessary or desired.

One or more sprinklers 14 may be mounted on each section of the water supply pipe 10 between each pair of wheels 12. A drain 20 may be provided on each sprinkler 14 or on the water supply pipe 10 for draining water from the wheel-line irrigation system 16 as necessary. Each of the components of the wheel-line irrigation system 16 described above in relation to FIG. 1 is commonly known in the art and is sold by such suppliers as Boss irrigation Systems of Lubbock, Tex. and Lake Company of Bakersfield, Calif. As one of ordinary skill in the art will recognize, there are many different types and embodiments of the typical parts and components of wheel-line irrigation systems, and those illustrated and described above in relation to the wheel-line irrigation system 16 are used as examples only, and embodiments of the present invention may include other or different parts and components.

As also shown in FIG. 1, the wheel-line irrigation system 16 includes an embodiment of a flush valve 22 of the present invention. The flush valve 22 may be configured for connection to the distal end 24 of the water supply pipe 10. When open, the flush valve 22 allows the water flowing through the wheel-line irrigation system 16 to flush or force any debris through the water supply pipe 10 and out of the wheel-line irrigation system 16 through the flush valve 22. When closed, the flush valve 22 prevents water from exiting the wheel-line irrigation system 16 through the distal end 24 of the water supply pipe 10, which forces the water to exit the water supply pipe 10 through the sprinklers 14.

As shown in FIG. 1, the flush valve 22 may be in-line with the water supply pipe 10, or in other words the longitudinal axis of the flush valve 22 may substantially line up with the longitudinal axis of the water supply pipe 10 of the wheel-line irrigation system 16. This allows the water flowing through the water supply pipe 10 to maintain the same direction as it flows from the water supply pipe 10, through the flush valve 22, and out of the wheel-line irrigation system 16. The in-line orientation of the automatic flush valve 22 may enable increased efficiency in flushing out the wheel-line irrigation system 16 because the water and any debris carried thereby does not have to change direction or manipulate any corners. As a result, the straight flow path may decrease the time necessary to drain the wheel-line irrigation system 16 and may reduce any possibility that debris will become trapped or clogged in the flush valve 22, Furthermore, by not having to negotiate 90 degree or other high-angle turns within the flush valve 22, the water flowing through the flush valve 22 better maintains its momentum and flushing power.

Figure 2:
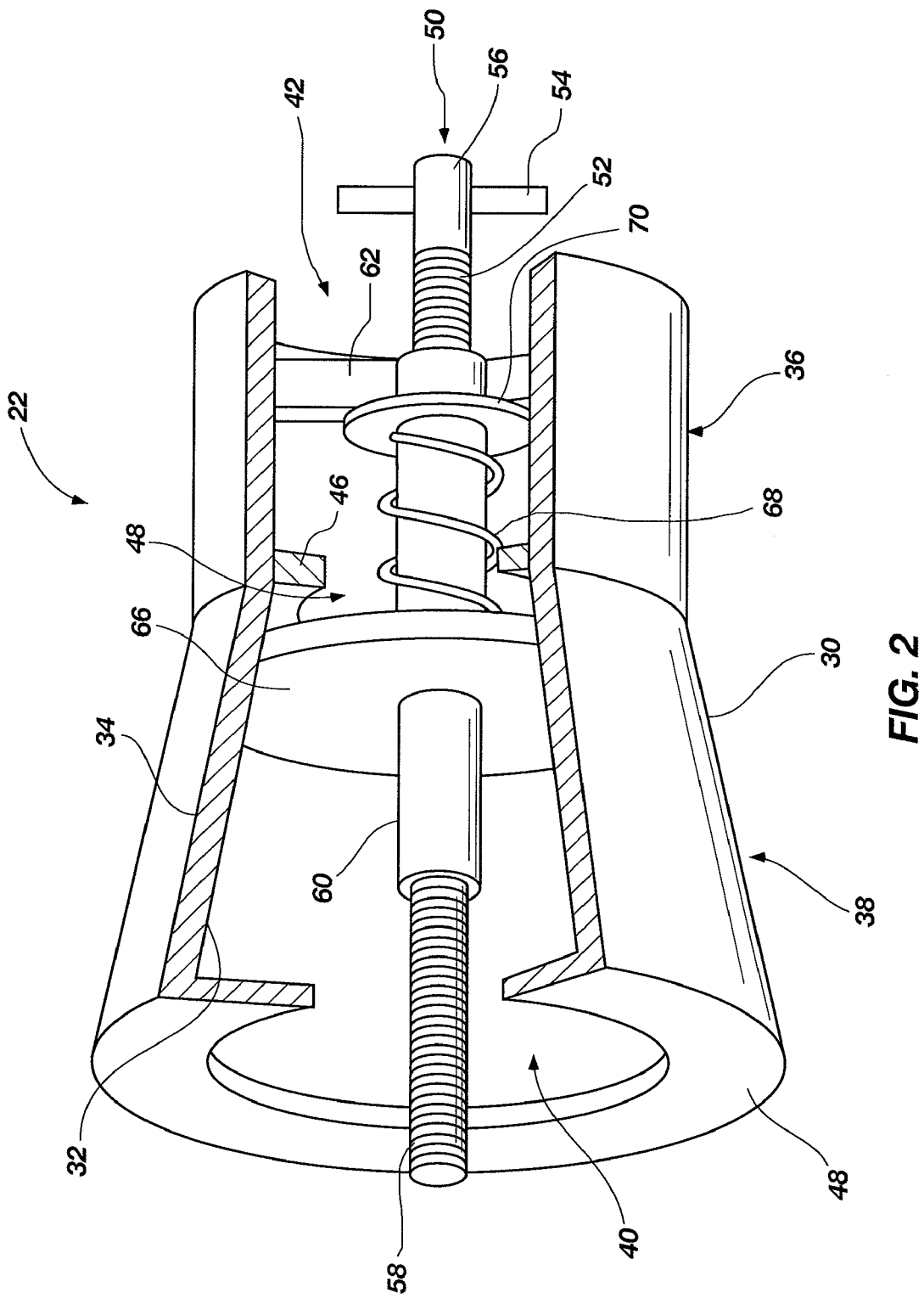
FIG. 2 is an enlarged, partially cut away, perspective view of the flush valve shown in FIG. 1.

FIG. 2 is an enlarged, partially cut away, perspective view of the flush valve 22. As shown in FIG. 2, the flush valve 22 includes a body 30 having an inner wall 32 and an outer wall 34. The body 30 also includes an inlet 40 and an outlet 42. As shown in FIG. 2, the inlet 40 and the outlet 42 may be substantially in-line. In other words, both the inlet 40 and the outlet 42 may be centered about the longitudinal axis of the body 30, to enable any water or debris flowing through the automatic flush valve 22 to flow in a generally straight path through the flush valve 22 from the inlet 40 to the outlet 42. The in-line orientation of the inlet 40 and the outlet 42 may increase the flushing and draining efficiency of the flush valve 22, as described previously in relation to FIG. 1.

The body 30 also may include a substantially cylindrical first housing 36 connected to a frustoconical second housing 38. The first housing 36 and the second housing 38 may be secured together by a threaded joint, a welded joint, or by fasteners such as for example bolts or screws. In additional embodiments, the body 30 may comprise a single housing, or the body 30 may comprise a plurality of housings having varying shapes and sizes. The frustoconical second housing 38 may extend from the substantially cylindrical first housing 36 in a generally radially outwardly direction. The frustoconical second housing 38 may include a cap 44 which may extend from the outer wall 34 in a radially inwardly direction toward the longitudinal axis of the body 30. The cap 44 may be configured so that the inlet 40 has a size and shape complementary to an outlet or end of a water supply pipe section of a wheel-line irrigation system. In other embodiments, the size of the cap 44 may be configured so the end of a water supply pipe section of a wheel-line irrigation system may be partially inserted into the inlet 40.

With continued reference to FIG. 2, the flush valve 22 may have an interior sealing wall 46, which, in some embodiments, may separate the substantially cylindrical first housing 36 and the frustoconical second housing 38. The sealing wall 46 may extend from the inner wall 32 of the body 30 in a generally radially inward direction toward the longitudinal axis of the body 30. In additional embodiments, the sealing wall 46 may extend from the longitudinal axis of the body 30 in a generally radially outward direction toward the inner wall 32 of the body 30. The body 30 and the sealing wall 46 may be formed of any suitable material. Such material may be selected for low density and high strength. Suitable materials include, for example, metals and metal alloys (e.g., an aluminum alloy), polymer materials, and polymer blends.

Figure 3:
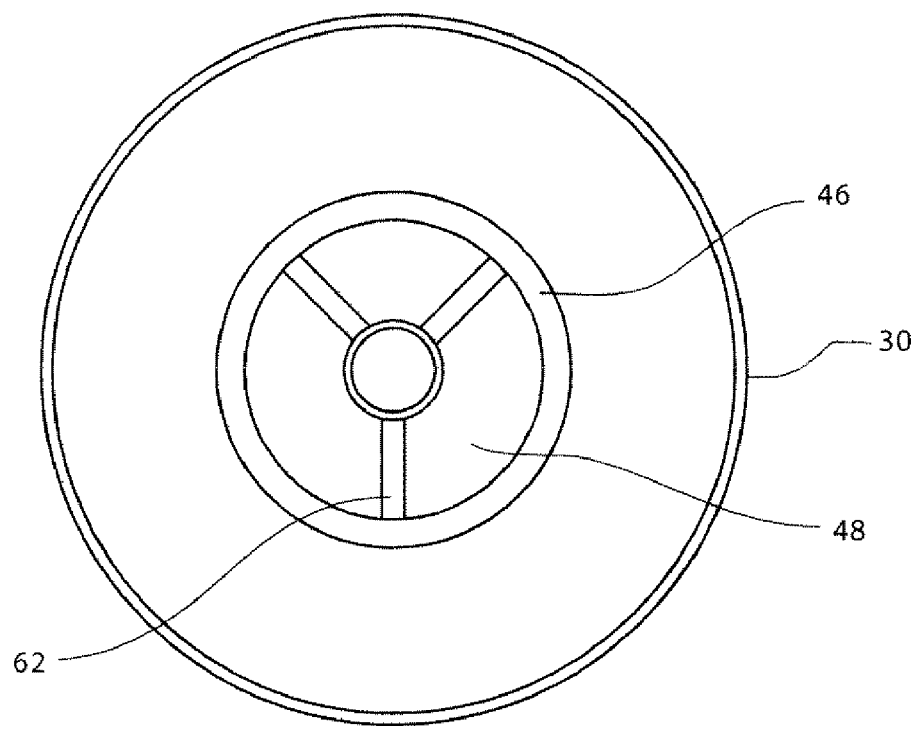
FIG. 3 is an end view of the body of the valve shown in FIGS. 1 and 2.
Figure 4:
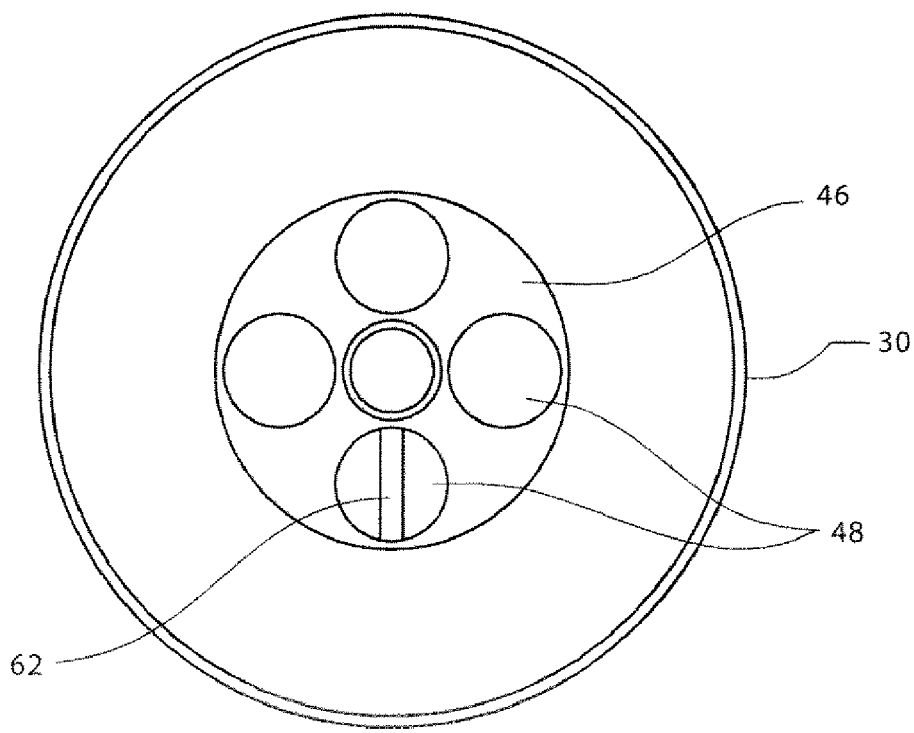
FIG. 4 is an end view of another embodiment of a flush valve of the present invention.

The sealing wall 46 may include or define at least one aperture therein. FIG. 3 is a view of the end of the body 30 of the flush valve 22 proximate the inlet 40, the cap 44 is not illustrated to facilitate illustration of the interior of the body 30. As shown in FIG. 3, the sealing wall 46 may include or define one large aperture 48 in some embodiments. In additional embodiments, like that shown in FIG. 4, the sealing wall 46 may include a plurality of apertures 48. The aperture(s) 48 may be configured to allow the passage of water and debris therethrough. The aperture(s) 48 should be large enough to allow debris to freely pass therethrough and to ensure that debris does not easily clog the aperture(s) 48. By way of example and not limitation, the total cross-sectional area of the aperture(s) 48 may be greater than about thirty-two square centimeters (32 cm$^2$) (about five square inches (5 in$^2$)). As additional non-limiting examples, the total cross-sectional area of the aperture(s) 48 may be between about forty-five square centimeters (45 cm$^2$) (about seven square inches (7 in$^2$)) and about two hundred fifty-one square centimeters (251 cm$^2$) (about thirty-nine square inches (39 in$^2$)) or the total cross-sectional area of the aperture(s) 48 may be between about sixty-two square centimeters (62 cm$^2$) (about nine point six square inches (9.6 in$^2$)) and about one hundred fifty-three square centimeters (153 cm$^2$) (about twenty-three point seven square inches (23.7 in$^2$)).

Referring again to FIG. 2, the flush valve 22 may further include a valve stem 50 extending longitudinally along the longitudinal axis of the body 30. The valve stem 50 may include a threaded shaft 52, a collar 56, and a pin 54. The threaded shaft 52 of the valve stem 50 connects to the body 30 by engaging an internally threaded tube or bracket 60. The bracket 60 may be connected to the inner wall 32 of the body 30 by one or more braces 62. The threaded interface between the bracket 60 and the valve stem 50 may be configured to allow the valve stem 50 to be moved longitudinally along the longitudinal axis of the body 30 by rotating the valve stem 50. The end 58 of the threaded shaft 52 opposite the pin 54 and collar 56 may be configured to secure the flush valve 22 to the end of a section of a water supply pipe of an irrigation system by engaging an internally threaded bracket in the section of the water supply pipe. In other embodiments, the flush valve 22 may be configured to be secured to the distal end of a water supply pipe of an irrigation system using any other suitable method. By way of example and not limitation, the flush valve 22 may comprise an external flange (not shown) having threaded holes extending therethrough, and the flush valve 22 may be connected to a distal end of a water supply pipe using bolts extending through the threaded holes on the flange of the flush valve 22 and through corresponding holes on a complementary flange on the water supply pipe, as described in further detail below in relation to the flush valve 122 shown in FIG. 6. As another non-limiting example, the flush valve 22 may comprise a toothed flange that engages a complementary toothed flange on the distal end of a water supply pipe 10, as described in further detail below in relation to the flush valve 222 shown in FIGS. 7-8.

Figure 5:
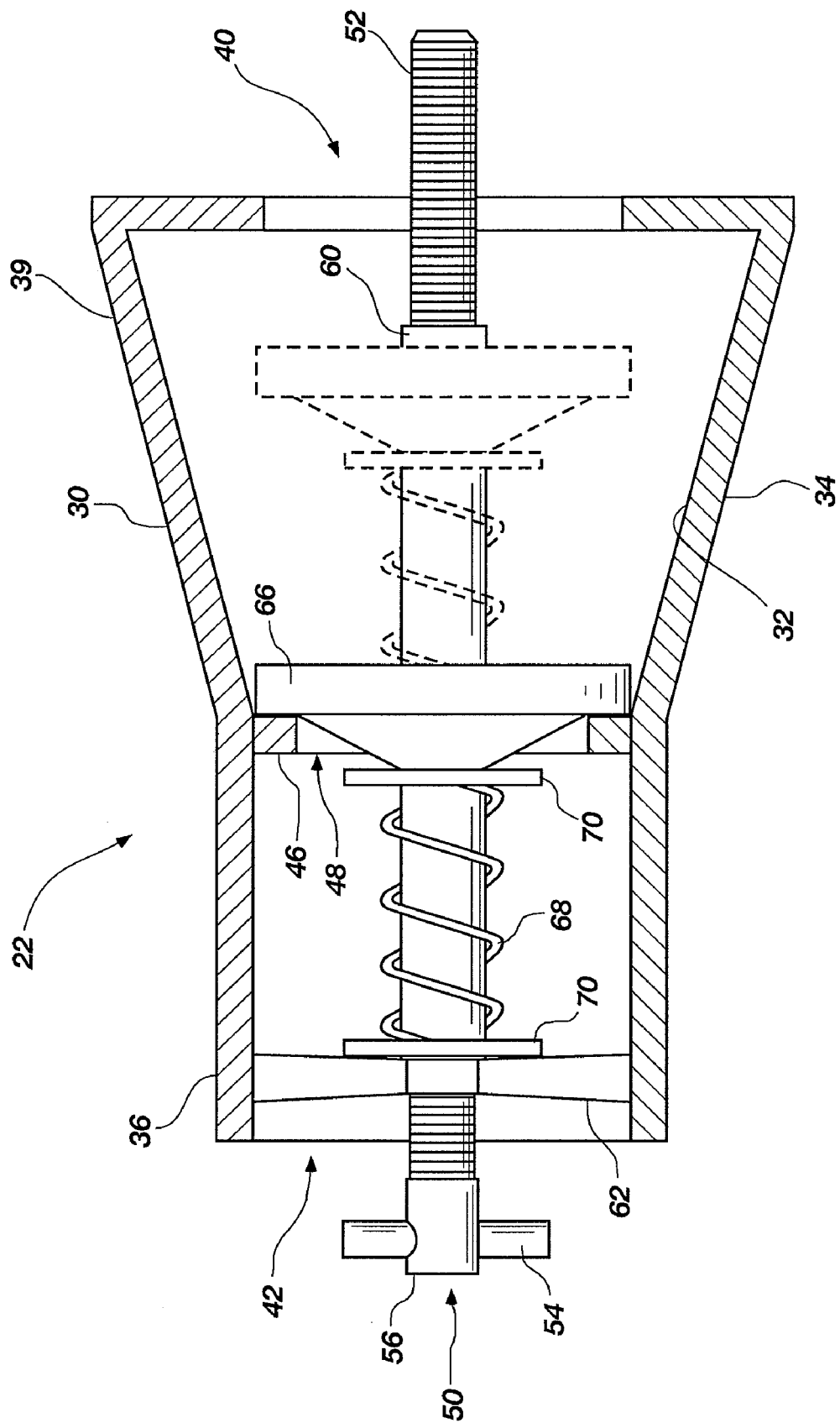
FIG. 5 is a cross-sectional view of the flush valve shown in FIGS. 1 and 2.

FIG. 5 is a cross-sectional side view of the flush valve 22 shown in FIG. 2. As shown in FIG. 5, the bracket 60 may support a moveable sealing member 66 disposed within the body 30 of the flush valve 22. For example, the moveable sealing member 66 may be slideably mounted on the bracket 60 between the inlet 40 and the sealing wall 46. In other words, the moveable sealing member 66 may be mounted on the bracket 60 in such a manner as to allow the moveable sealing member 66 to slide in a longitudinal direction along a length of the bracket 60 in a direction generally parallel to the longitudinal axis of the flush valve 22. For example, the sealing member 66 may comprise a generally planar disc having a generally annular shape and a central aperture, and the bracket 60 may extend through the central aperture of the generally annular sealing member 66. By way of example and not limitation, the moveable sealing member 66 may be formed from a resilient polymer material. In additional embodiments, however, the sealing member 66 may comprise a metal material, a ceramic material, or a composite material.

The moveable sealing member 66 may be moveable between a first "closed" (position shown in solid lines in FIG.

5) and a second "open" position (shown in dashed lines in FIG. 5), and may be biased to the open position. For example, the moveable sealing member 66 may be configured to abut against the sealing wall 46 in the first closed position to form a seal and prevent the passage of water or debris through the aperture(s) 48 in the sealing wall 46 to the outlet 42. In the open position, as shown in dashed lines in FIG. 5, the moveable sealing member 66 may be displaced from the sealing wall 46, thereby allowing water and debris to flow around the sealing member 66 within the frustoconical second portion 38 of the body 30, through the aperture(s) 48 in the sealing wall 46, and though the outlet 42 of the flush valve 22.

As previously mentioned, the moveable sealing member 66 may be biased to the second open position shown in dashed lines in FIG. 5. By way of example and not limitation, the flush valve 22 may further include a spring 68 axially mounted on the bracket 60 between the moveable sealing member 66 and the braces 62. Washers 70 optionally may be mounted between the spring 68 and the braces 62 and between the spring 68 and the moveable sealing member 66 to support the spring 68. In its relaxed or uncompressed state (shown in dashed lines in FIG. 5), the spring 68 may be configured to prevent the moveable sealing member 66 from abutting against the sealing wall 46 and closing the flush valve 22 by biasing the moveable sealing member 66 in a position axially removed from the sealing wall 46. The spring 68 may be configured to automatically compress a sufficient distance to allow the moveable sealing member 66 to abut and seal against the sealing wall 46 when the pressure differential between the inlet 40 and the outlet 42 reaches a predetermined threshold value, so as to close automatically the flush valve 22. By way of example and not limitation, the predetermined threshold value of the pressure differential between the inlet 40 and the outlet 42 may be reached when the water pressure in the water supply pipe 10 reaches a pressure of between about seventy five percent (75%) and about one hundred percent (100%) of a selected operating pressure of the wheel-line irrigation system 16 within the water supply pipe 10. As the pressure differential between the inlet 40 and the outlet 42 increases toward the predetermined threshold value, the moveable sealing member 66 may be incrementally pushed toward the sealing wall 46.

In additional embodiments, by way of example and not limitation, instead of using a spring 68 to bias the moveable sealing member 66 in the open position, the moveable sealing member 66 comprises an elastically deformable material and may be configured to elastically deform, deflect, or bend from an open position to a closed position when the pressure differential between the inlet 40 and the outlet 42 reaches a predetermined threshold value.

Figure 6:
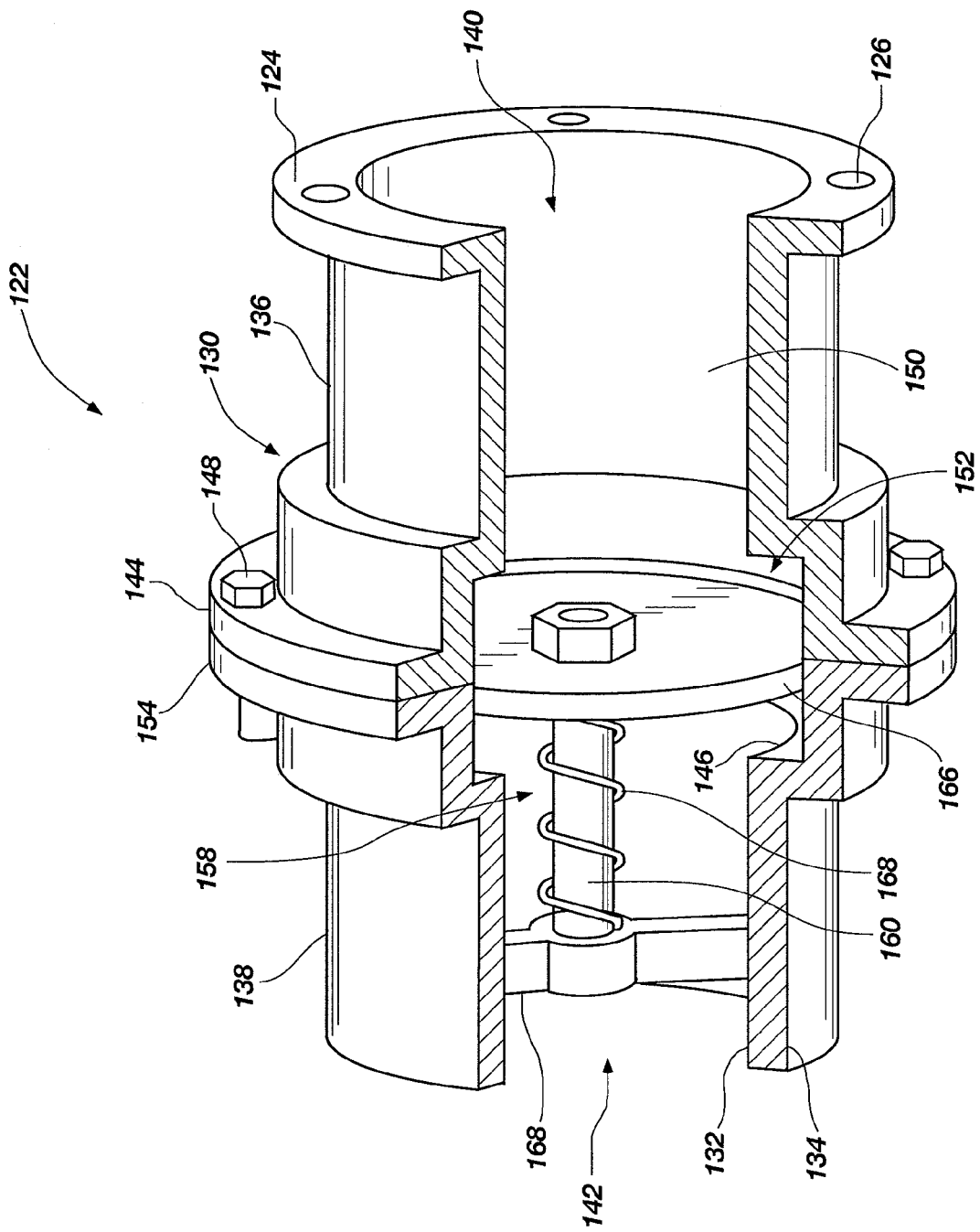
FIG. 6 is a partially cut away perspective view of another embodiment of a flush valve of the present invention.

Another embodiment of a flush valve 122 of the present invention is shown in FIG. 6. The flush valve 122 may include a body 130 having an inlet 140 and an outlet 142. As shown in FIG. 6, the inlet 140 and the outlet 142 may be substantially in-line, or both centered about the longitudinal axis of the body 130, to enable any water or debris flowing through the automatic flush valve 122 to flow in a straight path from the inlet 140 to the outlet 142. The in-line orientation of the inlet 140 and the outlet 142 increases the flushing and draining efficiency of the flush valve 122 as described previously in relation to the flush valve 22 shown in FIG. 1.

The flush valve 122 may be configured for attachment to the end of a water supply pipe of an irrigation system by a flange 124 having one or more threaded through-holes 126. The threaded through-holes 126 may be connected by bolts to corresponding holes on a complementary flange on the water supply pipe. Alternatively, by way of example and not limitation, the flush valve 122 may be configured for attachment to the end of a water supply pipe of an irrigation system by a valve stem substantially similar to the valve stem 50 described previously in relation to the flush valve 22 shown in FIG. 2 used to connect the flush valve 22 to the end of the water supply pipe 10 of the wheel-line irrigation system 16 (FIG. 1). In additional embodiments, the flush valve 122 may be configured for attachment to the end of a water supply pipe by a toothed flange that engages a complementary toothed flange on the end of the water supply pipe as described below in relation to the flush valve 222 shown in FIGS. 7-8, or by any other suitable method.

The body 130 may further include an inner wall 132 and an outer wall 134. The body 130 may be generally cylindrical in shape and may include a first housing 136 and a second housing 138. The first housing 136 and the second housing 138 may be substantially similar in size and shape as shown in FIG. 6. In additional embodiments, the first housing 136 and the second housing 138 may have different sizes or shapes. The first housing 136 may have a flange 144, and the second housing 138 may have a flange 154. The flanges 144, 154 may be configured to connect the housings 136, 138 together. The flanges 144, 154 each may include one or more corresponding internally threaded through-holes which may be used to secure the flanges 144, 154 together using bolts 148. In other embodiments, the flanges 144, 154 may be secured together by for example, an adhesive, a coupler, a threaded joint, or they may be welded together.

As shown in FIG. 6, the first housing 136 and the second housing 138 may form a first cavity 150 and a second cavity 152 when secured together, and the second cavity 152 may have a diameter larger than that of the first cavity 50. The first cavity 150 may be separated from the second cavity 152 by a sealing wall 146. The sealing wall 146 may extend from the inner wall 132 of the body 130 generally toward the longitudinal axis of the body 130. In other embodiments, the sealing wall 146 may extend from the longitudinal axis of the body 130 generally toward the inner wall 132. In additional embodiments, the body 130 may include a single housing that has a diameter that varies along its longitudinal axis or that has a single diameter. The body 130 and the sealing wall 146 may be formed of any suitable material, such as those previously described in relation to the body 30 and the sealing wall 46.

The sealing wall 146 may include or define at least one aperture 158 therein. As shown in FIG. 6, the sealing wall 146 may include one large aperture 158. In additional embodiments, the sealing wall 146 may include a plurality of apertures 158. The aperture(s) 158 may be configured to allow the passage of water and debris therethrough. By way of example and not limitation, the total cross-sectional area of the aperture(s) 158 may be greater than about thirty-two square centimeters (32 cm$^2$) (about five square inches (5 in$^2$)). As additional non-limiting examples, the total cross-sectional area of the aperture(s) 158 may be between about forty-five square centimeters (45 cm$^2$) (about seven square inches (7 in$^2$)) and about two hundred fifty-one square centimeters (251 cm$^2$) (about thirty-nine square inches (39 in$^2$)) or the total cross-sectional area of the aperture(s) 158 may be between about sixty-two square centimeters (62 cm$^2$) (about nine point six square inches (9.6 in$^2$)) and about one hundred fifty-three square centimeters (153 cm$^2$) (about twenty-three point seven square inches (23.7 in$^2$)).

Referring again to FIG. 6, the flush valve 122 may further include a bracket 160. The bracket 160 may be connected to the inner wall 132 of the body 130 by one or more braces 162. The bracket 160 may support a moveable sealing member 166 disposed within the body 130. For example, the moveable sealing member 166 may be slideably mounted on the bracket 160 between the inlet 140 and the sealing wall 146. In other words, the moveable sealing member 166 may be mounted on the bracket 160 in such a manner as to allow the moveable sealing member 166 to slide in a longitudinal direction along a length of the bracket 160 in a direction generally parallel to the longitudinal axis of the flush valve 122. For example, the sealing member 166 may comprise a generally planar disc having a generally annular shape and a central aperture, and the bracket 160 may extend through the central aperture of the generally annular sealing member 166. The moveable sealing member 166 may be formed from any suitable material, such as those previously described in relation to the sealing member 66.

The moveable sealing member 166 may be moveable between a first "closed" (not shown) and a second "open" position (the position shown in FIG. 6), and may be biased to the open position. For example, the moveable sealing member 166 may be configured to abut against the sealing wall 146 in the first closed position to form a seal and prevent the passage of water or debris through the aperture(s) 158 in the sealing wall 146 to the outlet 142, In the second open position, as shown in FIG. 6, the moveable sealing member 166 may be displaced from the sealing wall 146, thereby allowing water and debris to flow around the sealing member 166 within the second cavity 152 of the body 130, through the aperture(s) 158 in the sealing wall 146, and though the outlet 142 of the flush valve 122.

As previously mentioned, the moveable sealing member 166 may be biased to the second open position shown in FIG. 6. By way of example and not limitation, the flush valve 122 may further include a spring 168 axially mounted on the bracket 160 between the moveable sealing member 166 and the braces 162. Washers (not shown), like the washers 70 described previously in relation to the flush valve 22 shown in FIG. 5, optionally may be mounted between the spring 168 and the braces 162 and between the spring 168 and the moveable sealing member 166 to provide support for the spring 168. In its relaxed or uncompressed state, the spring 168 may be configured to prevent the moveable sealing member 166 from abutting against the sealing wall 146 and closing the flush valve 122 by biasing the moveable sealing member 166 in a position axially removed from the sealing wall 146. The spring 168 may be configured to automatically compress a sufficient distance to allow the moveable sealing member 166 to abut and seal against the sealing wall 146 when the pressure differential between the inlet 140 and the outlet 142 reaches a predetermined threshold value so as to close automatically the flush valve 122. By way of example and not limitation, the predetermined threshold value of the pressure differential between the inlet 140 and the outlet 142 may be reached when the water pressure in a water supply pipe of an irrigation system, to which the flush valve 122 is secured, reaches a pressure of between about seventy five percent (75%) and about one hundred percent (100%) of a selected operating pressure of the irrigation system within the water supply pipe. As the pressure differential between in the inlet 140 and the outlet 142 increases toward the predetermined threshold value, the moveable sealing member 166 may be incrementally pushed toward the sealing wall 146.

In additional embodiments, by way of example and not limitation, instead of using a spring 168 to bias the moveable sealing member 166 in the open position, the moveable sealing member 166 may comprise an elastically deformable material and may be configured to elastically deform, deflect, or bend from an open position to a closed position when the pressure differential between the inlet 140 and the outlet 142 reaches a predetermined threshold value.

Figure 8:
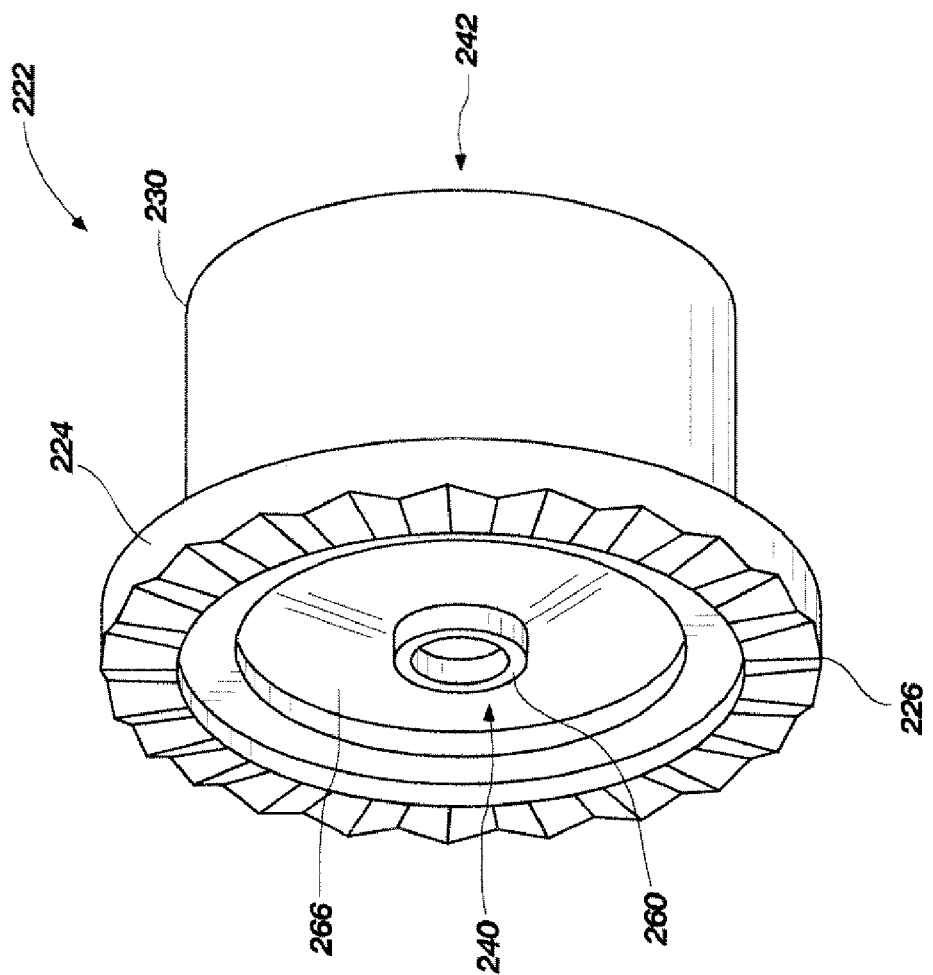
FIG. 8 is perspective view of the flush valve shown in FIG. 7.
Figure 7:
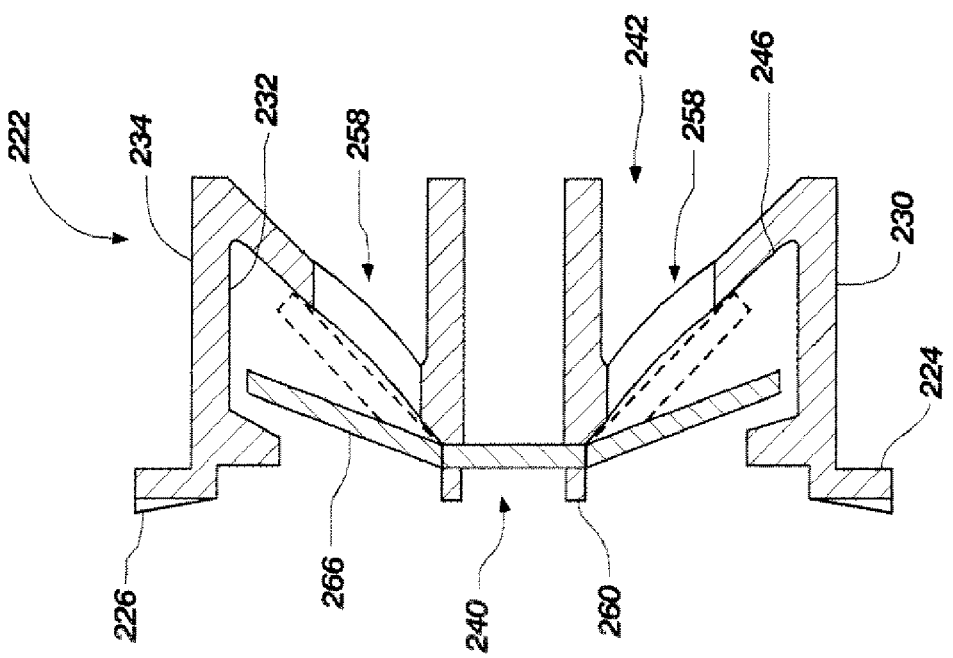
FIG. 7 is a cross-sectional view of yet another embodiment of a flush valve of the present invention.
Figure 9:
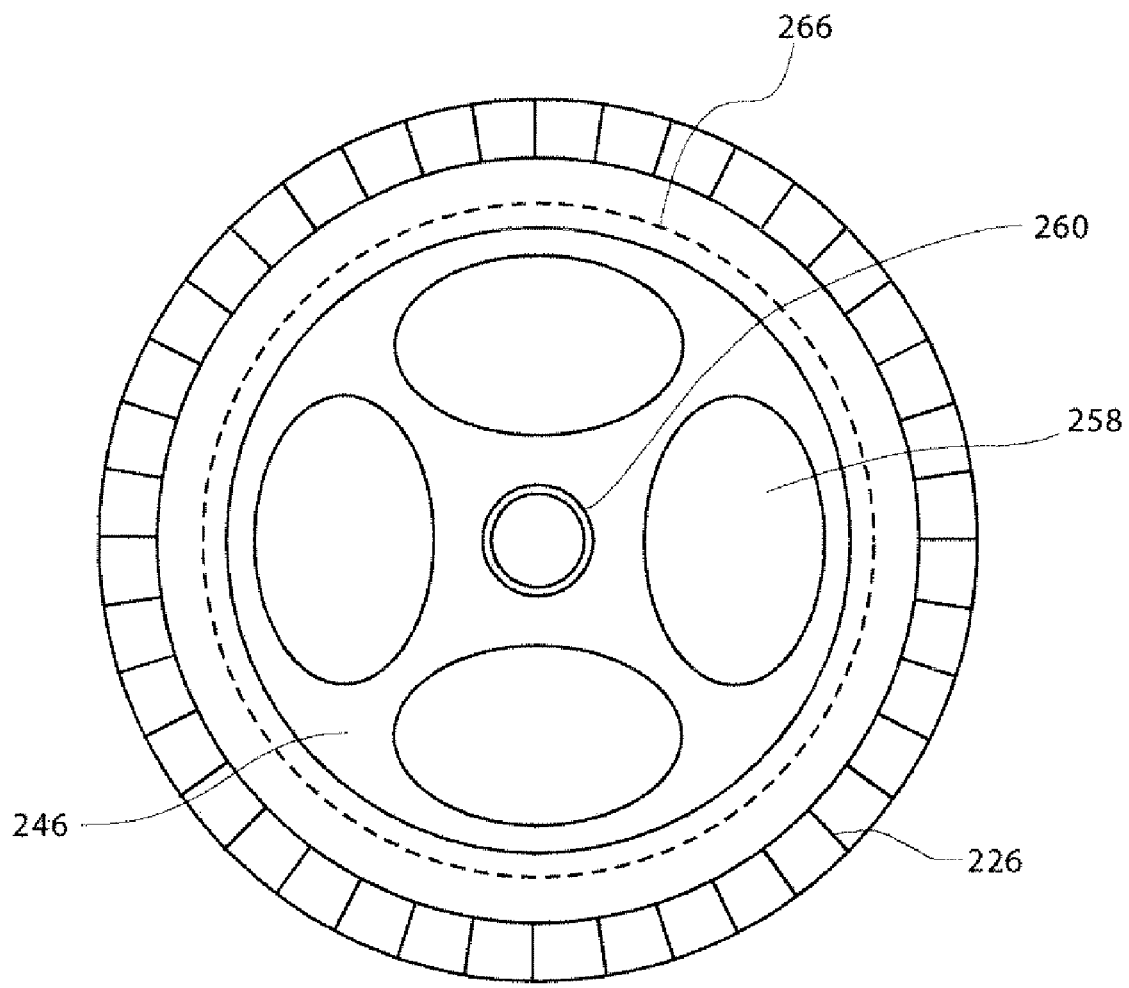
FIG. 9 is an end view of the flush valve shown in FIGS. 7 and 8.

Another embodiment of a flush valve 222 of the present invention is shown in FIGS. 7-9. The flush valve 222 may include a body 230 having an inlet 240 and an outlet 242. As shown in FIGS. 7 and 8, the inlet 240 and the outlet 242 may be substantially in-line, or both centered about the longitudinal axis of the body 230, to enable any water or debris flowing through the automatic flush-valve 222 to flow in a straight path from the inlet 240 to the outlet 242. The in-line orientation of the inlet 240 and the outlet 242 increases the flushing and draining efficiency of the flush valve 222 as described previously in relation to the flush valve 22 shown in FIG. 1.

The flush valve 222 may be configured for attachment to the end of a water supply pipe of an irrigation system by a flange 224 having a plurality of teeth 226. The plurality of teeth 226 may include a large number of teeth as in the embodiment shown in FIG. 8 or in additional embodiments the plurality of teeth 226 may have as few as two teeth. The plurality of teeth 226 on the flange 224 may engage complementary teeth on a flange on the distal end of a water supply pipe. The flange 224 and the complementary flange on the distal end of the water supply pipe may then be secured together by for example, an adhesive, a coupler, a band lock, bolts, or a welded joint.

The flush valve 222 may also include a bracket 260 along the longitudinal axis of the body 230. The bracket 260 may include internal threads (not shown). In other embodiments, a valve stem substantially similar to the valve stem 50 described previously in relation to the flush valve 22 shown in FIG. 2 may engage the bracket 260. The valve-stem may be used to secure the flush valve 222 to the distal end of the water supply pipe of an irrigation system in a manner similar to that described above in relation to the flush valve 22 shown in FIG. 2. As another non-limiting example, the flush valve 222 may be configured to be secured to the distal end of a water supply pipe of an irrigation system using any other suitable method. By way of example and not limitation, the flush valve 222 may comprise threaded holes extending through the flange 224, and the flush valve 222 may be connected to a distal end of a water supply pipe using bolts extending through the threaded holes on the flange 224 and through corresponding holes on a complementary flange on the water supply pipe, as described previously in relation to the flush valve 122 shown in FIG. 6.

The body 230 may further include an inner wall 232, an outer wall 234, and a sealing wall 246. The sealing wall 246 may extend from the inner wall 232 of the body 230 in a generally radially inward direction toward the longitudinal axis of the body 230. In additional embodiments, the sealing wall 246 may extend from the longitudinal axis of the body 230 in a generally radially outward direction toward the inner wall 232 of the body 230. The body 230 and the sealing wall 246 may be formed of any suitable material, such as those previously described in relation to the body 30 and sealing wall 46 of the flush valve 22 shown in FIG. 2.

The sealing wall 246 may include at least one aperture 258 therein. As seen in FIG. 9, a top view of the flush valve 222 shown in FIGS. 7 and 8, the sealing wall 246 may include four apertures 258. In additional embodiments, the sealing wall 246 may include one large aperture or a plurality of apertures. The aperture(s) 258 may be configured to allow the passage of water and debris therethrough. By way of example and not limitation, the total cross-sectional area of the aperture(s) 258 may be greater than about thirty-two square centimeters (32 cm$^2$) (about five square inches (5 in$^2$)). As additional non-limiting examples, the total cross-sectional area of the aperture(s) 258 may be between about forty-five square centimeters (45 cm$^2$) (seven square inches (7 in$^2$)) and about two hundred fifty-one square centimeters (251 cm$^2$) (thirty-nine square inches (39 in$^2$)) or the total cross-sectional area of the aperture(s) 258 may be between about sixty-two square centimeters (62 cm$^2$) (nine point six square inches (9.6 in$^2$)) and about one hundred fifty-three square centimeters (153 cm$^2$) (twenty-three point seven square inches (23.7 in$^2$)).

Referring again to FIG. 7, the flush valve 222 may further include a moveable sealing member 266 disposed with the body 230 of the flush valve 222. For example, the moveable sealing member 266 may be mounted on the bracket 260 between the inlet 240 and the sealing wall 246. The sealing member 266 may comprise a generally planar disc having a generally annular shape and a central aperture, and the bracket 260 may extend through the central aperture of the generally annular sealing member 266.

The moveable sealing member 266 may be moveable between a first "closed" (position shown in dashed lines in FIG. 7) and a second "open" position (shown in solid lines in FIG. 7), and may be biased to the open position. For example, the moveable sealing member 266 may be configured to abut against the sealing wall 246 in the first closed position to form a seal and prevent the passage of water or debris through the aperture(s) 258 in the seating wall 246 to the outlet 242. In the open position, the moveable sealing member 266 may be displaced from the sealing wall 246, thereby allowing water and debris to flow around the sealing member 266 through the aperture(s) 258 in the sealing wall 246 and though the outlet 242 of the flush valve 222.

As previously mentioned, the moveable sealing member 266 may be biased to the second open position shown in solid lines in FIG. 7. By way of example and not limitation, the movable sealing member 266 may be formed from a resilient, yet elastically deformable polymer material configured to be naturally biased in the open position when relaxed or not subject to external forces. The moveable sealing member 266 may be configured to elastically deform, deflect, or bend from the open position to the closed position when the pressure differential between the inlet 240 and the outlet 242 reaches a predetermined threshold value, so as to close automatically the flush valve 222. By way of example and not limitation, the predetermined threshold value of the pressure differential between the inlet 240 and the outlet 242 may be reached when the water pressure in a water supply pipe of an irrigation system, to which the flush valve 222 is secured, reaches a pressure of between about seventy five percent (75%) and about one hundred percent (100%) of a selected operating pressure of the irrigation system within the water supply pipe. As the pressure differential between in the inlet 240 and the outlet 242 increases toward the predetermined threshold value, the moveable sealing member 266 may be incrementally deformed, deflected, or bent toward the sealing wall 246.

In use and operation the flush valve 22, 122, 222 may be secured to the end of a water supply pipe of an irrigation system. When it is desired to irrigate, the water supply pipe may be pressurized to provide a pressure differential between the inlet 40, 140, 240 and the outlet 42, 142, 242 of the flush valve 22, 122, 222, respectively, having a magnitude sufficient to cause the moveable sealing member 66, 166, 266 to move automatically from the second "open" position to the first "closed" position. The pressure differential may have a magnitude sufficient to cause the moveable sealing member 66, 166, 266 to move from the second position to the first position when the water pressure in the water supply pipe of the irrigation system: reaches a pressure between about seventy five percent (75%) and about one hundred percent (100%) of a selected operating pressure.

When it is desired to flush the irrigation system of debris, the water supply pipe may be depressurized below the magnitude sufficient to cause the moveable sealing member 66, 166, 266 to move automatically from second position to the first position. The depressurization allows the moveable sealing member 66, 166, 266 to move automatically from the first position to the second position and water to flow through the flush valve 22, 122, 222 from the inlet 40, 140, 240 to the outlet 42, 142, 242 to urge debris out from the water supply pipe through the flush valve 22, 122, 22.

The flush valve 22, 122, 222 also enables an irrigation system to be drained of water quickly, thereby reducing the time needed between irrigation cycles. Thus, flush valve 22, 122, 222 allows an irrigation system to be flushed of any debris without having the operator travel to the end of the water supply pipe to manually open a valve to flush out the irrigation system. Furthermore, as the pressure in the irrigation system may be decreased below the normal operating pressure or a predetermined percentage thereof every time the water pressure is turned on or off, the irrigation system may be automatically flushed each time the system is turned on and off.

Although the foregoing description contains many specifics, these are not to be construed as limiting the scope of the present invention, but merely as providing certain representative embodiments. Similarly, other embodiments of the invention can be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. An irrigation system comprising:
at least one water supply pipe;
at least one sprinkler device mounted to the at least one water supply pipe;
a valve attached to a longitudinal end of the at least one water supply pipe, the valve comprising:
a valve body having an inlet and an outlet, wherein the inlet and the outlet are positioned substantially in-line with the at least one water supply pipe; and
a moveable sealing member disposed within the valve body, the moveable sealing member being moveable between a first position and a second position, the moveable sealing member configured to prevent fluid flow from the inlet to the outlet in the first position and to allow fluid flow from the inlet to the outlet in the second position, the moveable sealing member biased to the second position and configured to move automatically from the second position to the first position when a magnitude of a pressure differential between the inlet and the outlet of the valve body reaches a predetermined threshold value; and
a valve stem extending through at least a portion of the valve body, the valve stem configured to engage the at least one water supply pipe, the moveable sealing member disposed around at least a portion of the valve stem and configured to slide longitudinally along at least a portion of the valve stem between the first position and the second position.

2. The irrigation system of claim 1, wherein the valve body further comprises:

an outer wall;
an inner wall; and
a sealing wall extending from the inner wall toward a longitudinal center of the valve body, the sealing wall having at least one aperture extending therethrough located between the inlet from the outlet.

3. The irrigation system of claim 2, wherein the moveable sealing member is configured to abut against the sealing wall of the valve body and prevent fluid flow from the inlet to the outlet through the at least one aperture in the first position and to allow fluid flow from the inlet to the outlet through the at least one aperture in the second position.

4. The irrigation system of claim 3, further comprising a spring disposed between the moveable sealing member and the sealing wall, wherein the spring is configured to prevent the moveable sealing member from abutting against the sealing wall when compressed less than a predetermined distance, wherein the spring is configured to compress the predetermined distance when the magnitude of the pressure differential between the inlet and the outlet of the valve body reaches the predetermined threshold value.

5. The irrigation system of claim 4, wherein the valve stem is disposed along the longitudinal center of the valve body.

6. The irrigation system of claim 3, wherein the moveable sealing member is configured to elastically deform against the sealing wall to close the valve when the magnitude of the pressure differential between the inlet and the outlet of the valve body reaches the predetermined threshold value.

7. The irrigation system of claim 2, wherein the at least one aperture of the sealing wall is configured to allow the passage of debris therethrough.

8. The irrigation system of claim 7, wherein the at least one aperture has a cross-sectional area approximately 32 square centimeters or greater.

9. The irrigation system of claim 1, wherein the moveable sealing member comprises a resilient polymer material.

10. The irrigation system of claim 1, wherein the inlet of the valve body comprises a first diameter and the outlet of the valve body comprises a second diameter, wherein the valve body increases in diameter along its length from the outlet to the inlet.

11. A method of discharging accumulated debris from an irrigation water supply pipe having at least one sprinkler device mounted thereto, the method comprising:
attaching a valve to a longitudinal end of the irrigation water supply pipe, the valve comprising:
a valve body having an inlet and an outlet positioned substantially in-line with the irrigation water supply pipe; and
a moveable sealing member disposed within the valve body, the moveable sealing member being moveable between a first closed position and a second open position, the moveable sealing member configured to prevent fluid flow from the inlet to the outlet in the first closed position and to allow fluid flow from the inlet to the outlet in the second open position;
a valve stem extending through at least a portion of the valve body and engaged with the irrigation water supply pipe, the moveable sealing member disposed around at least a portion of the valve stem and configured to slide longitudinally along at least a portion of the valve stem;
biasing the moveable sealing member within the valve body to the second open position and enabling fluid communication through the valve body between the inlet and the outlet thereof in a direction generally parallel to a longitudinal axis of the irrigation water supply pipe;
generating a hydraulic pressure within the irrigation water supply pipe and providing a pressure differential between the inlet and the outlet having a magnitude sufficient to cause the moveable sealing member to move automatically from the second open position to the first closed position and prevent fluid communication through the valve body between the inlet and the outlet thereof; and
reducing the pressure differential between the inlet and the outlet and allowing the moveable sealing member to move automatically from the first closed position to the second open position and discharging water and accumulated debris out from the irrigation water supply pipe through the valve body.

12. The method of claim 11, wherein discharging water and accumulated debris out from the irrigation pipe through the valve body comprises passing the water and the accumulated debris through at least one aperture having a total cross-sectional area greater than about thirty-two square centimeters ($32\ cm^2$) in a sealing wall within the valve body.

13. An irrigation system, comprising:
at least one water supply pipe;
at least one sprinkler device mounted to the at least one water supply pipe; and
a valve attached to a longitudinal end of the at least one water supply pipe, the valve comprising:
a valve body, comprising:
an outer wall;
an inner wall; and
a sealing wall extending from the inner wall toward the longitudinal center of the valve body, the sealing wall having at least one aperture extending therethrough located between the inlet from the outlet, the at least one aperture having a cross-sectional area of 32 square centimeters or greater;
an inlet and an outlet positioned in-line with the at least one water supply pipe; and
a moveable sealing member disposed within the valve body, the moveable sealing member being moveable along a valve stem between a first position and a second position, the moveable sealing member configured to abut against the sealing wall of the valve body and prevent fluid flow from the inlet to the outlet through the at least one aperture in the first position and to allow fluid flow from the inlet to the outlet through the at least one aperture in the second position, the moveable sealing member biased to the second position and configured to move automatically along and relative to the valve stem from the second position along a linear path to the first position when a magnitude of a pressure differential between the inlet and the outlet of the valve body reaches a predetermined threshold value.

* * * * *